(12) United States Patent
Gamboa Arias (10) Patent No.: US 10,046,401 B2
(45) Date of Patent: Aug. 14, 2018

(54) HOLE SAW GUIDE DEVICE

(71) Applicant: Elber Gamboa Arias, North York (CA)

(72) Inventor: Elber Gamboa Arias, North York (CA)

( * ) Notice: Subject to any disclaimer, the term of this patent is extended or adjusted under 35 U.S.C. 154(b) by 281 days.

(21) Appl. No.: 15/033,993

(22) PCT Filed: Nov. 5, 2013

(86) PCT No.: PCT/CA2013/050841
§ 371 (c)(1),
(2) Date: May 3, 2016

(87) PCT Pub. No.: WO2015/066787
PCT Pub. Date: May 14, 2015

(65) Prior Publication Data
US 2016/0279716 A1   Sep. 29, 2016

(51) Int. Cl.
*B23B 51/04* (2006.01)

(52) U.S. Cl.
CPC ...... *B23B 51/0426* (2013.01); *B23B 2251/60* (2013.01); *Y10T 408/558* (2015.01); *Y10T 408/895* (2015.01)

(58) Field of Classification Search
CPC ............. B23B 51/0426; Y10T 408/558; Y10T 408/895; Y10T 408/8953; Y10T 408/8957
See application file for complete search history.

(56) References Cited

U.S. PATENT DOCUMENTS

| 3,810,514 | A | | 5/1974 | Viscovich | |
|---|---|---|---|---|---|
| 4,579,486 | A | * | 4/1986 | Damico | B23B 51/0426 408/115 R |
| 4,968,189 | A | | 11/1990 | Pidgeon | |
| 5,743,682 | A | * | 4/1998 | Chaney, Sr. | B23B 51/0426 408/204 |
| 5,871,310 | A | | 2/1999 | Mortenson | |
| 6,048,141 | A | * | 4/2000 | Freeman | B23B 51/0054 408/201 |
| 6,305,885 | B1 | | 10/2001 | Linthicum | |
| 6,409,437 | B1 | | 6/2002 | Metzger | |
| 6,857,830 | B2 | * | 2/2005 | Holcomb | B23B 49/02 408/115 R |
| 6,857,831 | B2 | * | 2/2005 | Davis | B23B 51/0433 408/204 |
| 6,881,016 | B2 | | 4/2005 | May | |

(Continued)

*Primary Examiner* — Eric A Gates
(74) *Attorney, Agent, or Firm* — Robert S. Smith (57) ABSTRACT

A guide for a hole saw for making a new larger hole in a work piece with an existing hole, the guide comprising a base sized to span the existing hole, the base comprising a central aperture, a plurality of discrete first contact surfaces for abutting an interior cylindrical wall of the existing hole, and a plurality of discrete second contact surfaces for abutting an exterior surface of the work piece surrounding the existing hole; the plurality of discrete second contact surfaces being substantially co-planar and being substantially perpendicular to the plurality of discrete first contact surfaces; a shaft having a first end sized to be received in an arbor of the hole saw and a second end to be slidably and rotatably received through the central aperture of the base; and the base biased to be located at or near the second end of the shaft.

27 Claims, 8 Drawing Sheets

(56) References Cited

U.S. PATENT DOCUMENTS

| | | | |
|---|---|---|---|
| 7,484,578 B2* | 2/2009 | Duncan | E21B 10/02 |
| | | | 175/402 |
| 8,137,036 B2* | 3/2012 | Wadley | B23B 49/026 |
| | | | 408/1 R |
| 8,696,268 B2* | 4/2014 | Bell | B23B 51/0426 |
| | | | 408/115 R |
| 8,753,048 B2* | 6/2014 | Naughton | B23B 51/0426 |
| | | | 408/204 |
| 2003/0213621 A1* | 11/2003 | Britten | B23B 51/0426 |
| | | | 175/404 |
| 2011/0135412 A1 | 6/2011 | Duncan | |
| 2012/0237306 A1 | 9/2012 | Naughton | |
| 2016/0273235 A1* | 9/2016 | Davidian | E04G 23/0207 |

* cited by examiner

HOLE SAW GUIDE DEVICE

CROSS-REFERENCE TO RELATED APPLICATIONS

This application is a national stage application of claiming priority of International Patent Application PCT/CA2013/050841 filed on 5 Nov. 2013.

BACKGROUND OF THE INVENTION

The present invention relates to hole saw pilot or guide devices, and more particularly to pilot and guide devices for use of a hole saw on a work piece with an existing hole.

Hole saws are typically manufactured as a cylindrical cup with a front peripheral cutting edge and a rear centrally located hub and arbor for attachment to a drill chuck. Cutting a hole in a work piece using a hole saw without a guide usually risks the hole saw 'walking' and creating scratches on the exterior surface of the work piece or producing a hole that may unintentionally be slanted (ie., not perpendicular) relative the exterior surface of the work piece. To solve this problem, hole saws are fitted with pilot bits to increase the accuracy of the hole saw. However, pilot bits are not useful when a hole saw is needed to create a new larger hole in a work piece that has an existing hole.

Several functional guides for piloting a hole saw to create a new larger hole in a work piece with an existing hole have been disclosed, for example, in U.S. Pat. No. 5,743,682 (issued 28 Apr. 1998), U.S. Pat. No. 5,871,310 (issued 16 Feb. 1999), U.S. Pat. No. 6,305,885 (issued 23 Oct. 2001), U.S. Pat. No. 6,409,437 (issued 25 Jun. 2002) and US Patent Publication Nos. 2012/0237306 (published 20 Sep. 2012) and 2103/0209187 (published 15 Aug. 2013). However, each of these guides are deficient in either not providing a firm seating of the guide within the existing hole or lacking clearance space between the guide and the rear of the cylindrical cup of the hole saw.

From the above, it is therefore seen that there exists a need in the art to overcome the deficiencies and limitations described herein and above.

SUMMARY OF THE INVENTION

In an aspect of the present invention there is provided, a guide for a hole saw for making a new larger hole in a work piece with an existing hole, the guide comprising: a base sized to span the existing hole, the base comprising a central aperture, at least three discrete first contact surfaces for abutting an interior cylindrical wall of the existing hole, and at least three discrete second contact surfaces for abutting an exterior surface of the work piece surrounding the existing hole; the at least three discrete second contact surfaces being substantially co-planar and being substantially perpendicular to the at least three discrete first contact surfaces; a shaft having a first end sized to be received in an arbor of the hole saw and a second end to be slidably and rotatably received through the central aperture of the base; and the base biased to be located at or near the second end of the shaft.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The foregoing and other objects, features and advantages of the invention will be apparent from the following more particular description of illustrative embodiments of the invention, as illustrated in the accompanying drawings in which like reference characters refer to the same parts throughout the different views. The drawings are not necessarily to scale, emphasis instead being placed upon illustrating the principles of the invention. Those skilled in the art will understand that the devices and methods specifically described herein and illustrated in the accompanying drawings are non-limiting exemplary embodiments. The features illustrated or described in connection with one exemplary embodiment can be combined with the features of other embodiments. Such modifications and variations are intended to be included within the scope of the present invention.

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 1A shows a front perspective view, FIG. 1B a side plan view,

DETAILED DESCRIPTION

Figure 1A:
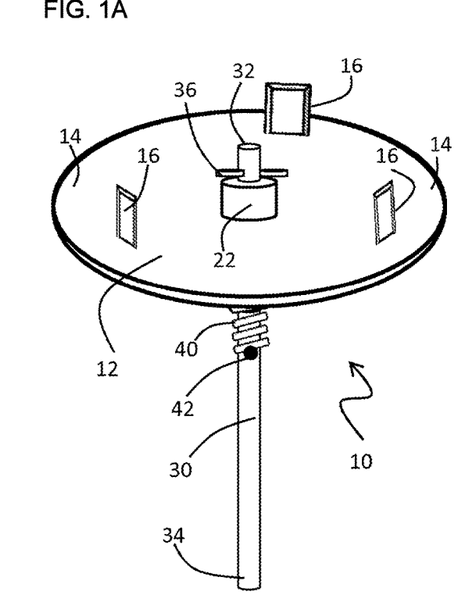
Figure 1B:
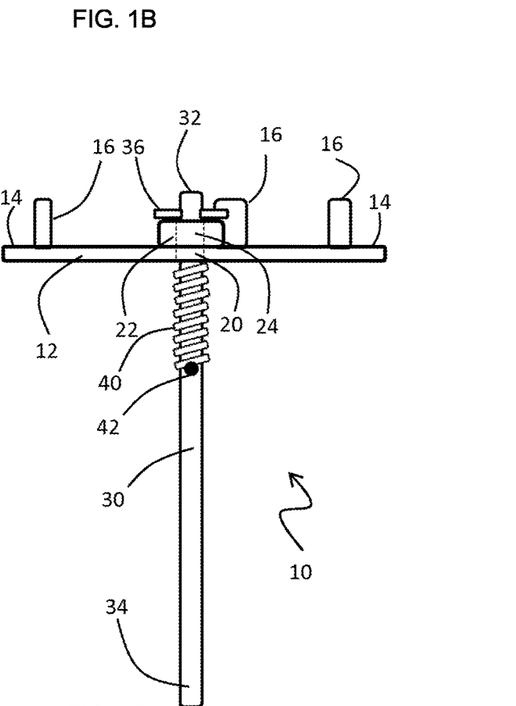
Figure 1C:
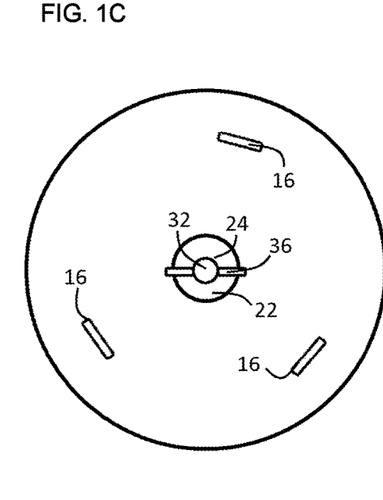
FIG. 1C a front plan view, and FIG. 1D a rear plan view of one embodiment of a guide device for a hole saw in accordance with the present invention.
Figure 1D:
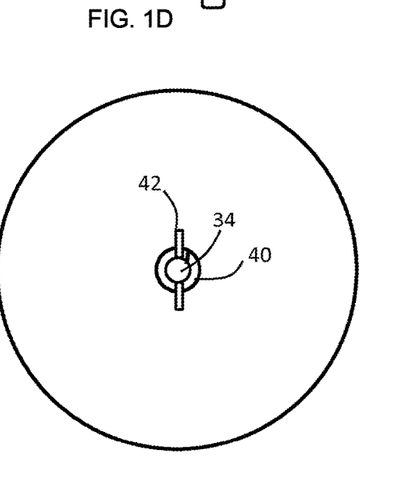

Referring to the drawings, FIG. 1A-1D shows different views of a guide device 10. FIG. 1A shows a front perspective view, FIG. 1B shows a side plan view, FIG. 1C shows a front plan view, and FIG. 1D shows a rear plan view. The guide device 10 comprises a base 12 formed as a disc shaped planar body or radially extending arms. The base is sized to span the diameter of an existing hole in a work piece and to provide on its front surface a peripheral planar contact point 14 that is parallel to and abuts a flat exterior surface of the work piece that surrounds the existing hole. A plurality of blades 16 extend from the front surface of the base. Each blade 16 provides a planar surface that is parallel to and abuts the interior cylindrical wall of the existing hole. The blades 16 are substantially perpendicular to the base 12 and its peripheral contact point 14.

The base 12 provides a centrally located aperture 20 and a sleeve 22 with a bore 24. Bore 24 and aperture 20 are coaxially aligned to slidably and rotatably receive a shaft 30. The shaft is elongate and cylindrical with a first end 32 and an opposing second end 34. First end 32 passes through the aperture 20 and bore 24. A retainer such as pin 36 is located at or near the first end 32 to keep base 12 from sliding off of the shaft 30. The second end 34 is received within the hub and arbor of a hole saw and is appropriately dimensioned, similar to conventional pilot bits, to fit within the hub and arbor of hole saws. In some embodiments the end 34 may have a hexagonal exterior shape for cooperation with known quick change drill systems.

The position of base 12 along shaft 30 is biased towards the first end 32 by a spring 40. Spring 40 is maintained in a restricted position along shaft 30 by a retainer such as pin 42.

Figure 2A:
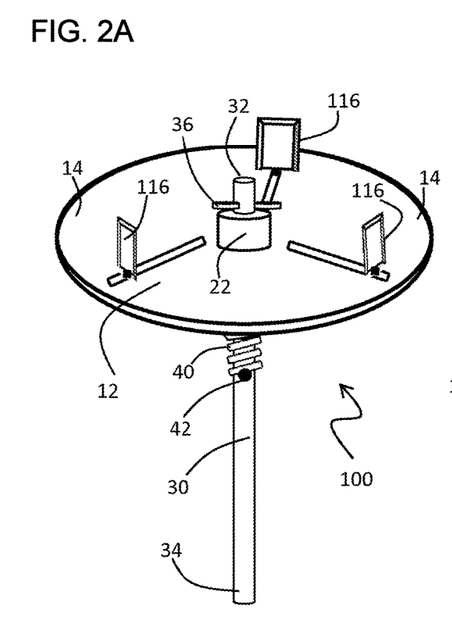
FIG. 2A shows a front perspective view, FIG. 2B a side plan view, FIG. 2C a front plan view, and FIG. 2D a rear plan view of an adjustable variant of the guide device shown in FIG. 1A-FIG. 1D.
Figure 2B:
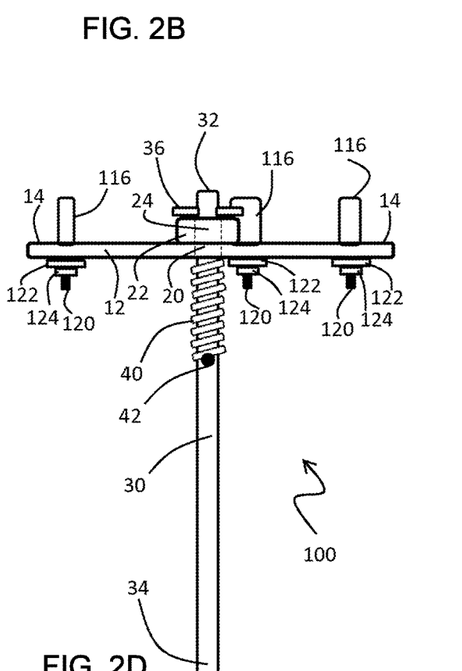
Figure 2C:
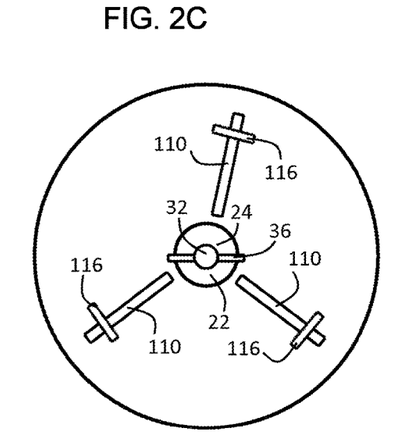
Figure 2D:
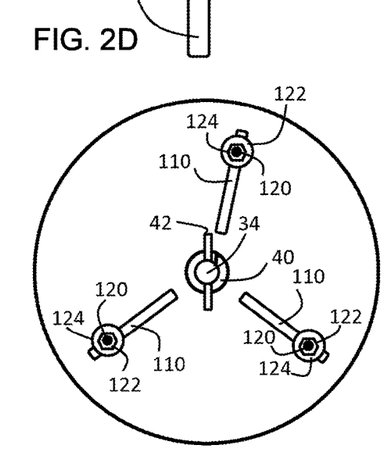

FIG. 2A-FIG. 2D show a variant of the guide device shown in FIG. 1A-FIG. 1D. FIG. 2A shows a front perspective view, FIG. 2B shows a side plan view, FIG. 2C shows a front plan view, and FIG. 2D shows a rear plan view. The guide device 100 comprises a base 12 formed as a disc shaped planar body or radially extending arms. The base is sized to span the diameter of an existing hole in a work piece and to provide on its front surface a peripheral planar contact point 14 that is substantially parallel to and abuts a flat exterior surface of the work piece that surrounds the existing hole. A plurality of linear slots 110 are cut out of the base 12.

Each slot 110 is aligned in a radial direction in between the center and a peripheral point of the base. Each slot 110 is slidably coupled to a single blade 116. Each blade 116 comprises a planar blade portion attached to a threaded bolt 120 or similar systems. Each slot receives a threaded bolt 120 of blade 116. The threaded bolt 120 passes through the slot 110 and is reversibly fastened by washer 122 and nut 124. The radial distance of blade 116 from the center of base 12 can be adjusted by loosening nut 124, sliding blade 116 along slot 110, and retightening nut 124. Thus, a plurality of blades 116 extend from the front surface of the base, with each blade slidably coupled to a slot 110. Each blade 116 provides a planar surface that is substantially parallel to and abuts the interior cylindrical wall of the existing hole. The blades 116 are substantially perpendicular to the base 12 and its peripheral contact point 14.

The base 12 provides a centrally located aperture 20 and a sleeve 22 with a bore 24. Bore 24 and aperture 20 are coaxially aligned to slidably and rotatably receive a shaft 30. The shaft is elongate and cylindrical with a first end 32 and an opposing second end 34. First end 32 passes through the aperture 20 and bore 24. A retainer such as pin 36 is located at or near the first end 32 to keep base 12 from sliding off of the shaft 30.

The second end 34 is received within the hub and arbor of a hole saw and is appropriately dimensioned, similar to conventional pilot bits, to fit within the hub and arbor of hole saws. In some embodiments the end 34 may have a hexagonal exterior shape for cooperation with known quick change drill systems. The position of base 12 along shaft 30 is biased towards the first end 32 by a spring 40. Spring 40 is maintained in a restricted position along shaft 30 by a retainer such as pin 42. The radial distance of each blade 116 from the center of the base is adjustable by sliding along a slot 110 and locking in a desired position. Each blade may be adjusted to any number of desired positions. The slot 110 may be provided with incremental detent mechanisms and indicia to provide for positions that correspond to standard hole sizes that would be expected in a work piece.

Figure 3:
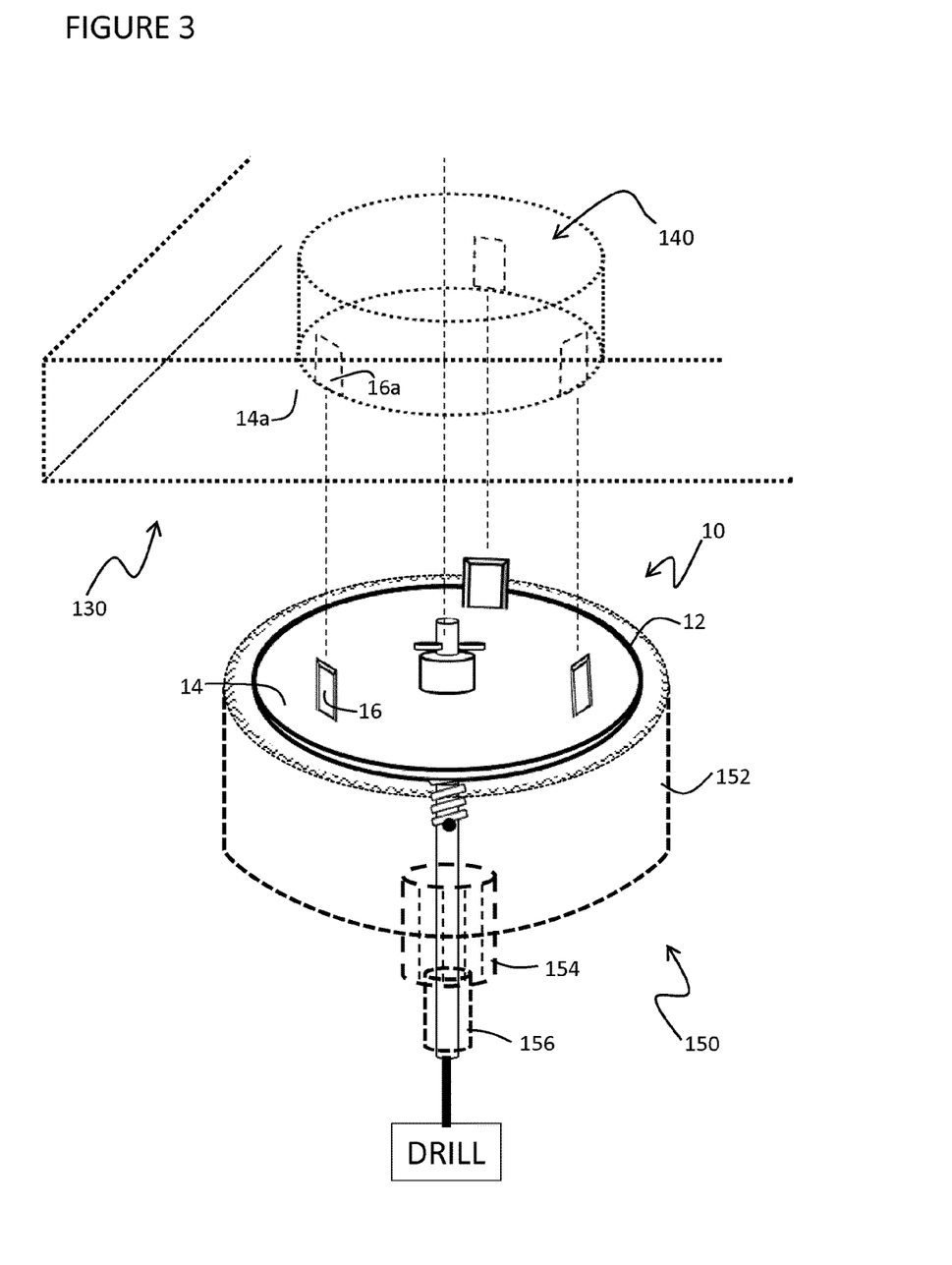
FIG. 3 shows a partially schematic view of the guide device shown in FIG. 1A-FIG. 1D in use.
Figure 4A:
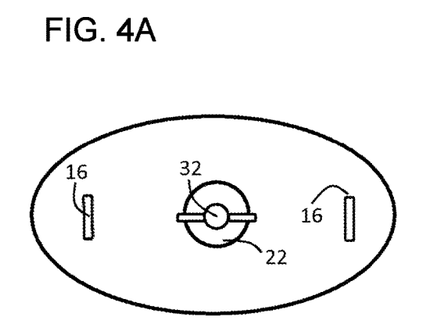
FIG. 4A-FIG. 4F shows front plan views of several variants of the guide device shown in FIG. 1A-FIG. 1D.
Figure 4B:
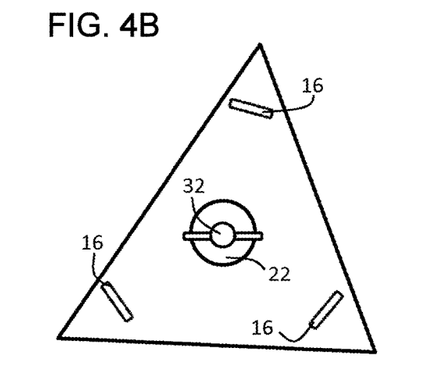
Figure 4C:
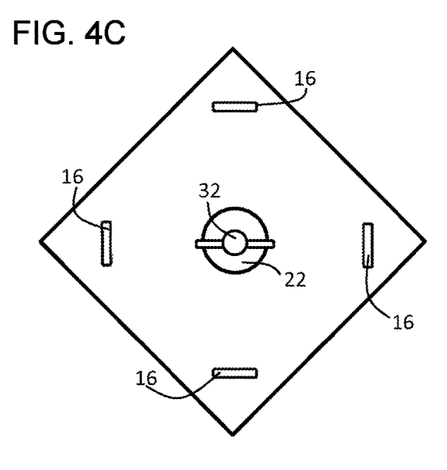
Figure 4D:
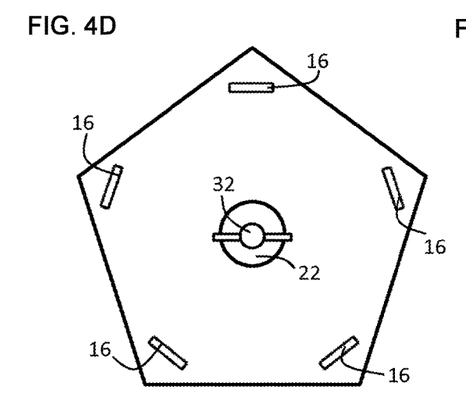
Figure 4E:
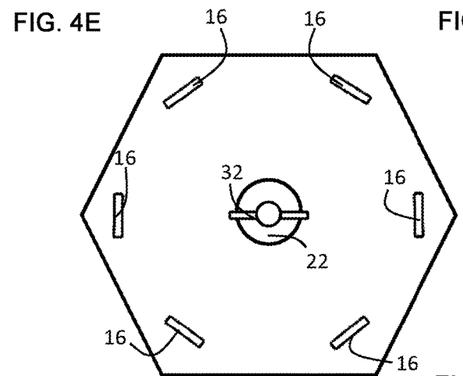
Figure 4F:
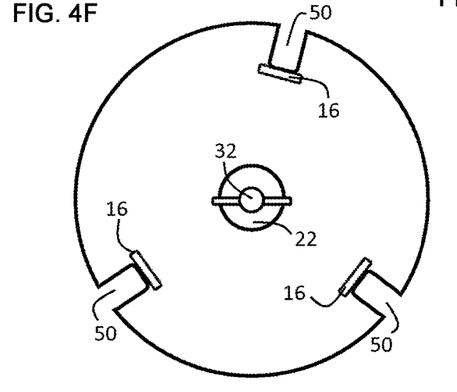
Figure 5A:
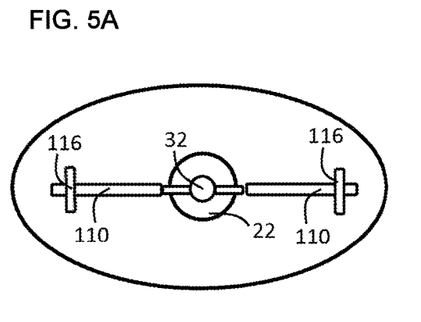
FIG. 5A-5F show front plan views of several variants of the guide device shown in FIG. 2A-FIG. 2D.
Figure 5B:
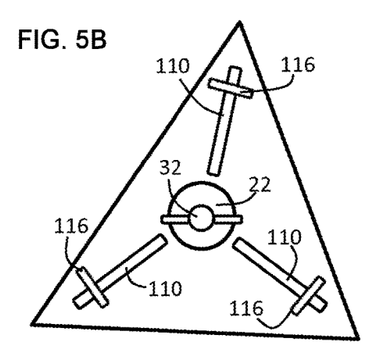
Figure 5C:
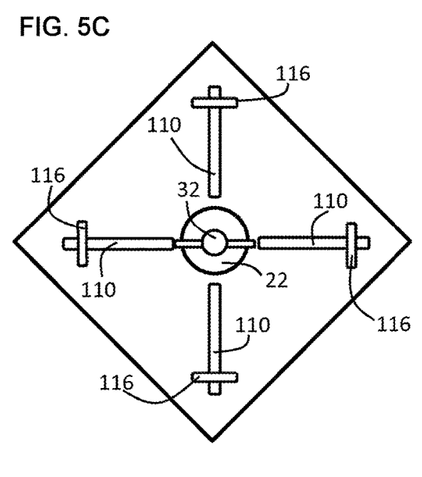
Figure 5D:
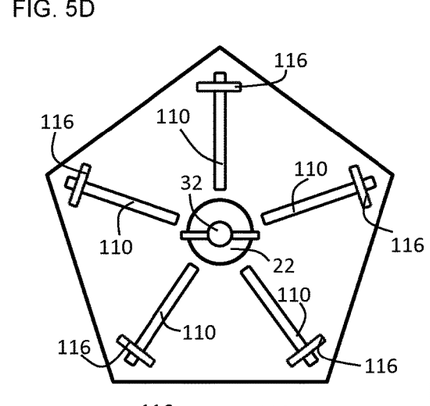
Figure 5E:
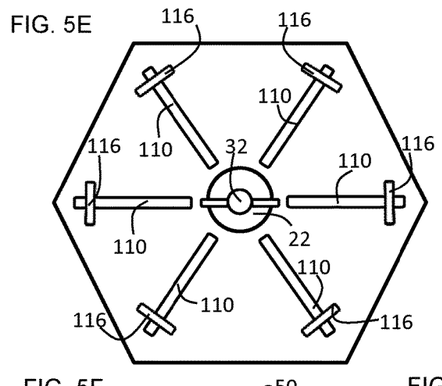
Figure 5F:
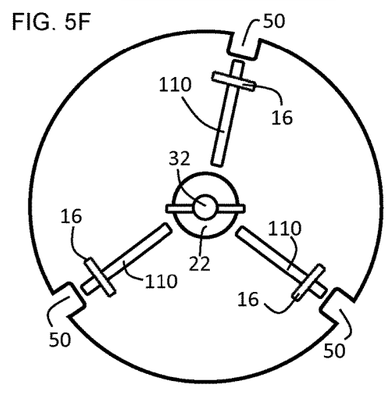

In use as shown in FIG. 3 the guide 10 is coupled to a hole saw by inserting and locking the second end 34 of shaft 30 within the hub 154 and arbor 156 of the hole saw 150. The complex or assembly of the hole saw and guide device 10 is then inserted and locked within a drill chuck so as to be driven by the drill motor. The front surface of the base 12 is aligned to be slightly axially advanced of the cutting edge of the cylindrical cup 152 of hole saw 150. With the drill motor off, the base 12 is positioned to engage the existing hole 140 in a work piece 130. The plurality of blades 16 each abut the interior cylindrical sidewall 16a of an existing hole 140 while the periphery of the base provides a plurality of contact point surfaces 14 to abut the flat exterior surface 14a of the work piece 130 that surrounds the existing hole 140. The perpendicular relationship of the blades 16 and the peripheral contact point surfaces 14 allow for a firm seating of the base 12 within the existing hole. Furthermore, the edges of the blades can dig in to the interior cylindrical sidewall of the existing hole to prevent rotational slippage of the base as the drill motor is actuated and the hole saw is advanced to cut through the work piece. As the hole saw is advanced through the work piece, shaft 30 rotates simultaneously with the hole saw and advances through aperture 20 compressing spring 40 between base 12 and pin 42. The force exerted by spring 40 contributes to achieving a firm and stationary seating of base 12 within the existing hole 140.

A few illustrative variants of the guide device have been described above. Several further illustrative variants and modifications will now be described. Still further variants, modifications and combinations thereof will recognized by the person of skill in the art.

FIG. 4A-FIG. 4F show a front plan view of several variants of the guide device 10 shown in FIG. 1A-FIG. 1D. The base can be varied to accommodate different shaped plates (i.e., ellipse, triangle, diamond, pentagon, hexagon) and corresponding radial arm configurations (i.e., 2 arms, 3 arms, 4 arms, 5 arms, 6 arms). The various modifications lend themselves to differing numbers of blades for abutting the interior cylindrical sidewall of an existing hole, thereby providing differing numbers of blade edges that can engage the interior cylindrical sidewall to promote a stationary position of the base while the hole saw and the shaft of the guide device rotate simultaneously. Furthermore, FIG. 4F also shows a modification of the circular base to provide gaps 50 and 60 cutout of the base periphery to create discrete contact points of the base periphery with the exterior surface of the work piece surrounding the existing hole, thus providing the base periphery with edges that can engage the exterior surface to promote a stationary position of the base while the hole saw and the shaft of the guide device rotate simultaneously.

FIG. 5A-FIG. 5F show a front plan view of several variants of the adjustable guide device 100 shown in FIG. 2. The base can be varied to accommodate different shaped plates (ie., ellipse, triangle, diamond, pentagon, hexagon) and corresponding radial arm configurations (ie., 2 arms, 3 arms, 4 arms, 5 arms, 6 arms). The various modifications lend themselves to differing numbers of blades for abutting the interior cylindrical sidewall of an existing hole, thereby providing differing numbers of blade edges that can engage the interior cylindrical sidewall to promote a stationary position of the base while the hole saw and the shaft of the guide device rotate simultaneously. Furthermore, FIG. 4F also shows a modification of the circular base to provide gaps 50 and 60 cutout of the base periphery to create discrete contact points of the base periphery with the exterior surface of the work piece surrounding the existing hole, thus providing the base periphery with edges that can engage the exterior surface to promote a stationary position of the base while the hole saw and the shaft of the guide device rotate simultaneously.

Figure 6A:
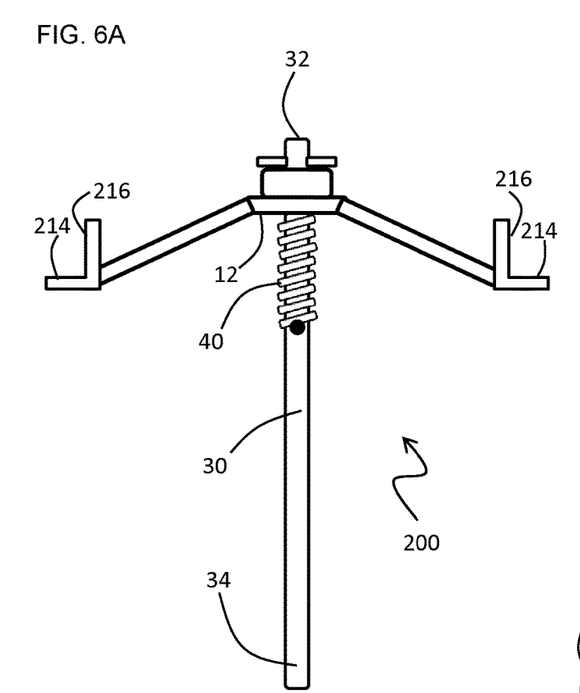
FIG. 6 shows other variants of the guide device shown in FIG. 1A-FIG. 1D.
Figure 6B:
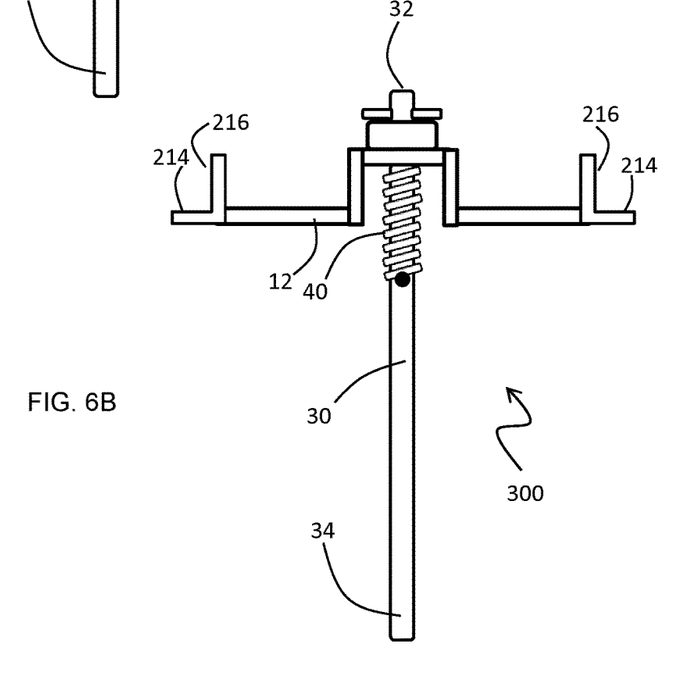
Figure 7A:
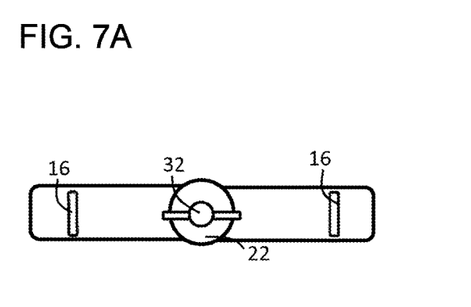
FIG. 7A-FIG. 7F shows front plan views, respectively similar to the variants shown in FIG. 4A-FIG. 4F, of several variants of the guide device shown in FIG. 1A-FIG. 1D.
Figure 7B:
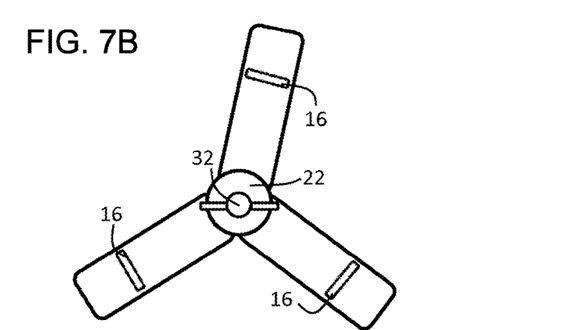
Figure 7C:
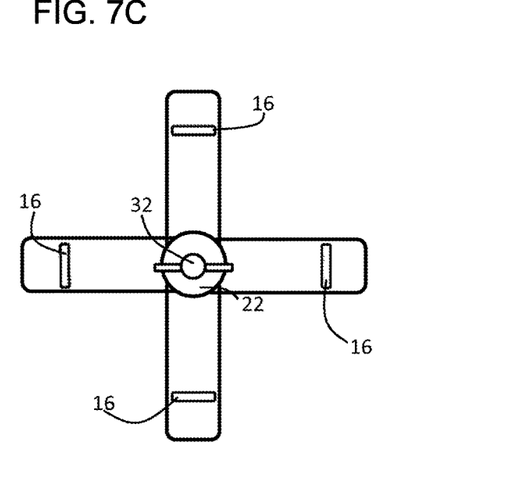
Figure 7D:
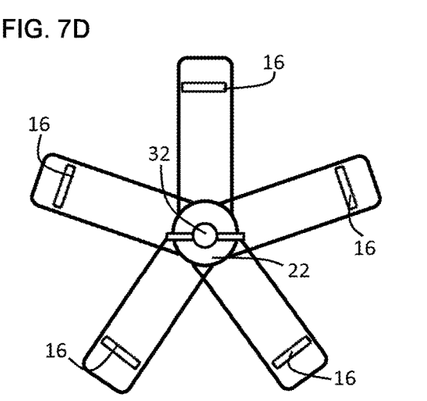
Figure 7E:
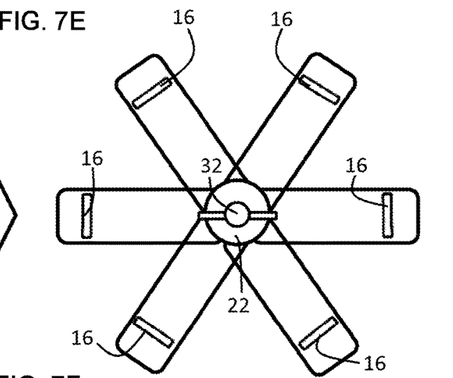
Figure 7F:
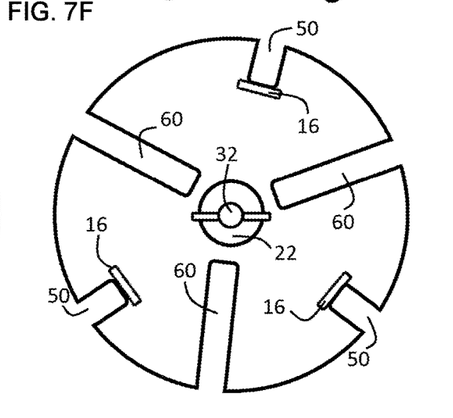
Figure 8A:
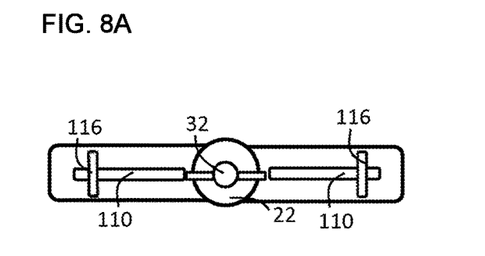
FIG. 8A-FIG. 8F show front plan views, respectfully similar to the variants shown in FIG. 5A-FIG. 5F, of several variants of the guide device shown in FIG. 1A-FIG. 1D
Figure 8B:
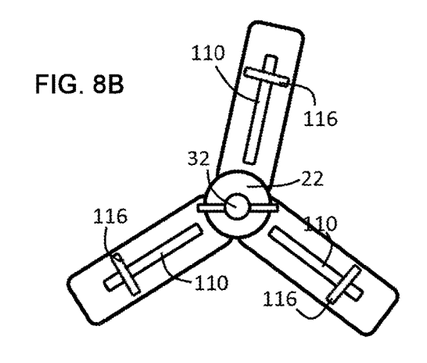
Figure 8C:
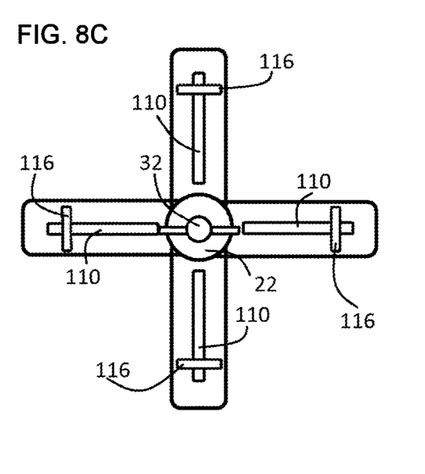
Figure 8D:
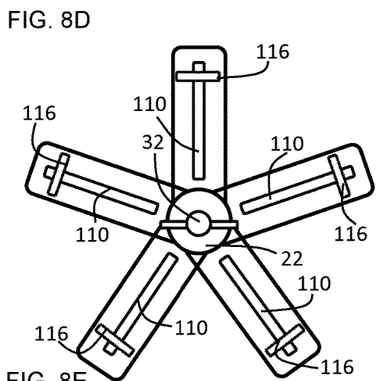
Figure 8E:
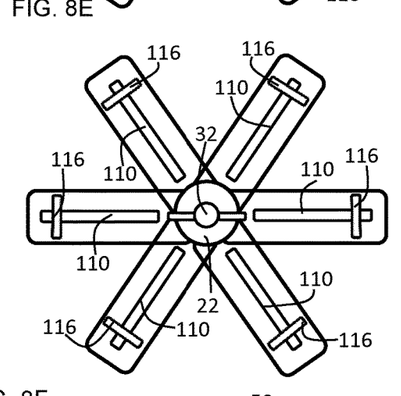
Figure 8F:
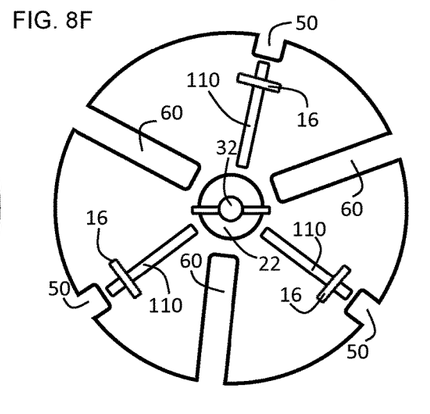

FIG. 6A-FIG. 6B show a side plan views of variants comprising a non-planar base with the base having a central portion offset from its perimeter. The offset central portion allows for greater clearance of a hole saw and more particularly greater clearance for a projection from the arbor at the hub portion into the interior of the cylindrical cup of a hole saw. For example, the cylindrical cup is typically screwed onto a threaded portion of the arbor hub collar and once fully screwed on the threaded portion extends into the lumen of the cylindrical cup. The offset central portion allows clearance for the threaded portion.

FIG. 6A shows a side plan view of a variant guide 200 with a base comprising angled arms extending radially from a central portion of the base with L-shaped brackets at the end of the radial arms. The L-shaped bracket provides a first contact surface 216 for abutting the interior cylindrical sidewall of an existing hole and a second contact surface 214 for abutting the exterior surface of a work piece surrounding the existing hole. The first and second contact surfaces are substantially perpendicular to each other. The guide device 200 shown in FIG. 6A can be further modified to be adjustable by providing a lockable hinge at the joint of each angled arm with the central portion of the base. The angle of the arm can then be adjusted to accommodate different sizes of existing holes.

FIG. 6B shows a side plan view of a variant guide 300 with a base comprising parallel arms extending radially from a central U-shaped portion of the base with L-shaped brackets at the end of the radial arms. The central U-shaped portion of the base provides a reservoir for receiving a projection of the hub into the interior lumen of the cylindrical cup of a hole saw. Each L-shaped bracket provides a first contact surface 216 for abutting the interior cylindrical sidewall of an existing hole and a second contact surface 214 for abutting the exterior surface of a work piece surrounding the existing hole. The first and second contact surfaces are substantially perpendicular to each other. The guide device 300 shown in FIG. 6B can be further modified to be adjustable using the slot mechanism shown in FIG. 2.

Variants and modifications of the guide device may be designed according to the following structural and/or functional relationships. The guide device will be used in conjunction with a hole saw for making a new larger hole in a planar work piece with an existing hole having a cross section area and an axial length.

The guide device will comprise a base sized to span the cross section area of the existing hole. The base will comprise a central aperture, a plurality of discrete first contact surfaces for abutting an interior cylindrical wall of the existing hole, and a plurality of discrete second contact surfaces for abutting an exterior surface of the work piece surrounding the existing hole. The guide device may further comprise a shaft having a first end sized to be received in an arbor of the hole saw and a second end to be slidably and rotatably received through the central aperture of the base. When the guide device includes a shaft coupled to the base, the base will be biased to be located at or near the second end of the shaft.

At least three discrete first contact surfaces of the base providing at least three discrete points of contact with the interior cylindrical sidewall surface of an existing hole is preferable. As shown in FIG. 4A-FIG. 4F and FIG. 5A-FIG. 5F, variants with 2, 3, 4, 5 or 6 discrete points of contact have been designed. While variants with 2 discrete points of contact are functional, variants with 3 or more discrete points of contact fare significantly better with respect to a firm seating and reduction of slippage or movement of the base when engaging an existing hole. Conversely, greater than 20 discrete points of contact with the interior cylindrical sidewall provide limited additional advantage. Thus, the number of discrete first contact surfaces of base abutting the interior cylindrical sidewall of the existing hole will typically range from 3 to 20, and more typically from 3 to 12. Examples of further ranges include 4 to 20, 4 to 12, 5 to 20 or 5 to 12. Similarly, the number of discrete second contact surfaces of the base abutting the exterior surface of the work piece surrounding the existing hole may range, for example, from 3 to 20, 3 to 12, 4 to 20, 4 to 12, 5 to 20 or 5 to 12. Having three to six discrete first contact surfaces for abutting the interior cylindrical sidewall and three to six discrete second contact surfaces abutting the exterior surface provides a good compromise of ease of manufacture while achieving a firm seating of the base in the existing hole. Depending on the number of discrete first contact surfaces the angular distance of a gap between consecutive first contact surfaces will typically range from 10 degrees to 150 degrees and more typically from 20 degrees to 150 degrees. Similarly, depending on the number of discrete second contact surfaces the angular distance of a gap between consecutive second contact surfaces will typically range from 10 degrees to 150 degrees, and more typically from 20 degrees to 150 degrees. The angular distance is measured between the closest edges of two consecutive first contact surfaces or two consecutive second contact surfaces.

The biasing mechanism need not be a spring. It can be any resilient or elastic mechanism for biasing the base towards the front end of the shaft, while allowing the shaft to slide and rotate within a central aperture of the base. Also, any convenient retainer or fastener may be used to position the biasing mechanism and need not be limited to retainer pin 42. For example, retainer pin 42 may easily be replaced with a washer welded to shaft 30.

The coupling of the shaft with the central aperture of the base can be bolstered or supported using any conventional mechanism such as a bored sleeve or collar or a cylindrical ball bearing casing.

The base may be any shape or size to accommodate different sizes of existing holes in different work piece materials, but the base size will be large enough to span the radial cross-section of the existing hole and small enough to fit inside the cylindrical cup of the hole saw as its peripheral cutting edge advances through the work piece.

The overall shape of the base may be planar or non-planar. The base may be comprised of a closed solid shape or an open shape such as a plurality of radial arms.

Whether planar or non-planar, or a closed or open shape, the base will be bound by two opposing surfaces, a front surface and a rear surface, and a perimeter. The distance between the two opposing surfaces will define the thickness of the base and will typically be minimized to provide greater clearance for advance of the hole saw to make a cut. The thickness will typically be less than 10 millimeters (mm). For example, the thickness may be less than 9 mm, 8 mm, 7 mm, 6 mm, 5 mm, 4 mm or less than any number therebetween. The front surface of the base faces the existing hole while the rear surface of the base faces the interior lumen of the cylindrical cup of the hole saw. The first and second contact surfaces extend axially and radially, respectively from the front surface of the base.

The base may be made of any suitable material or combinations of material including metal, plastic, rubber, wood, but will typically be metal or plastic. The base including first and second contact surfaces may be stamped from a single sheet or formed as a single piece in a mold or formed by a machining process.

The first and second contact surfaces may be integral with the base or one or both of the first and second contact surfaces may be reversibly or irreversibly attached to the base. The first contact surface abutting the interior cylindrical sidewall of the existing hole will typically be planar or arcuate, while the second contact surface abutting the exterior surface of the work piece surrounding the existing hole will typically be planar.

The first contact surface abutting the interior cylindrical sidewall of the existing hole may be planar or arcuate. For example, the planar blades shown in the drawings could be replaced with arcuate blades with the radius of curvature of the arcuate blades matching the radius of curvature of the interior cylindrical sidewall of the existing hole.

The first contact surface for abutting the interior cylindrical sidewall of the existing hole and the second contact surface for abutting the exterior surface surrounding the existing hole will typically be substantially perpendicular to each other. Furthermore, the first contact surface will typically be parallel to an axial plane of the shaft 30, while the second contact surface will typically be parallel to a radial plane of the shaft 30. When the base is planar, as for example shown in FIG. 1A-FIG. 1D, the first contact surface will typically be perpendicular to the base while the second contact surface will typically be parallel to the base. However, when the base is non-planar, as shown for example in FIG. 6A, the first and second contact surfaces need not be perpendicular or parallel with the base.

The first contact surface, the second contact surface, or both the first and second contact surfaces may be shaped to dig into the interior sidewall of the existing hole and/or the exterior surface of the work piece. For example, the first and/or second contact surfaces may comprise beveled edges or teeth.

Retainers to hold the base on the shaft may be reversible. Any suitable retainer may be used including a threaded cap, a snap fit washer, a cotter pin, a clip and the like. For example, retainer pin 36 shown in FIG. 1A-FIG. 1D and FIG. 2-FIG. 2D may be reversibly removed to allow replacement of a first base corresponding to a first size of an existing hole with a second base corresponding to a second size of existing hole. In this manner, a kit of many different sized bases may be packaged with a single shaft, and the appropriate sized base can be slidably and rotatably coupled to the shaft prior to each use.

The mechanism for adjusting the radial distance of a first contact surface from the center of the base need not be limited to a sliding mechanism and certainly need not be limited to the illustrative examples of radially aligned slots shown in FIG. 2A-FIG. 2D and FIG. 5A-FIG. 5F. For example, the radially aligned slots could be replaced by a series of radially aligned apertures for receiving the threaded bolt coupled to blade, with the apertures incrementally spaced in accordance with expected or pre-determined sizes of existing holes that would be known to occur within a work piece. In another example of a variant, a blade could be slidably coupled to a track aligned in a radial direction in between the center and a peripheral point of the base.

The track may comprise a detent mechanism and indicia to facilitate positioning of a first contact surface according to pre-determined sizes of existing holes that would be known to occur within a work piece. Furthermore, when coupled to the track the blade could be biased towards the end of the track closest to the periphery of the base.

An advantage of being able to independently adjust each contact surface for abutting the interior cylindrical sidewall of the existing hole is that the new larger hole may be axially offset from the existing hole. In work pieces where the existing hole is too close to the edge of a work piece or a desirable esthetic or structural feature of the workpiece, axially offsetting the new hole from the existing hole provides a distinct benefit.

The guide device will typically be used for a flat planar work piece. The work piece will typically have a flat exterior surface and a thickness equal to the axial length of the existing hole. Work piece surfaces are typically doors, walls, ceilings, floors, window frames, dry wall, wood, metal, glass, tiles, beams, and columns. The existing hole need not be cylindrical with a circular cross-section, although such a configuration will be most frequent. The existing hole may be tubular with a cross-section shape that is triangular, rectangular, or any other polygonal shape.

Still further variants, modifications and combinations thereof are contemplated and will be recognized by the person of skill in the art.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A guide for a hole saw for making a new larger hole in a planar work piece with an existing hole having a circular cross section, a diameter and an axial length, the guide comprising:

a base sized to span the circular cross section of the existing hole, the base comprising a central aperture, at least three discrete first contact surfaces for abutting an interior cylindrical wall of the existing hole, and at least three discrete second contact surfaces for abutting an exterior surface of the work piece surrounding the existing hole;

the at least three discrete second contact surfaces being substantially co-planar and being substantially perpendicular to the at least three discrete first contact surfaces;

a shaft having a first end sized to be received in an arbor of the hole saw and a second end to be slidably and rotatably received through the central aperture of the base; and the base biased to be located at or near the second end of the shaft.

2. The guide of claim 1, wherein the base is a planar plate with the second contact surfaces located at a periphery of the plate and the first contact surfaces located proximal to the periphery of the plate.

3. The guide of claim 1, wherein the base is co-planar with the second contact surfaces and perpendicular to the first contact surfaces.

4. The guide of claim 1, wherein the base is non-planar and a central portion of the base is offset from a perimeter of the base.

5. The guide of claim 1, wherein the number of first contact surfaces range from 3 to 12.

6. The guide of claim 1, wherein the angular distance of a gap between consecutive first contact surfaces ranges from 20 degrees to 150 degrees.

7. The guide of claim 1, wherein the number of second contact surfaces range from 3 to 12.

8. The guide of claim 1, wherein the angular distance of a gap between consecutive second contact surfaces ranges from 20 degrees to 150 degrees.

9. The guide of claim 1, wherein the first contact surface is planar.

10. The guide of claim 1, wherein the first contact surface is a rectangular blade.

11. The guide of claim 1, wherein the first contact surface is arcuate and the radius of curvature of the first contact surface matches the radius of curvature of the interior cylindrical wall of the existing hole.

12. The guide of claim 1, wherein the base comprises at least three radial arms extending from a central portion of the base, one of the first contact surfaces and one of the second contact surfaces located on each radial arm.

13. A guide for a hole saw for making a new larger hole in a planar work piece with an existing hole having a circular cross section, a diameter and an axial length, the guide comprising:

a base sized to span the circular cross section of the existing hole, the base comprising a central aperture, at least three discrete first contact surfaces for abutting an interior cylindrical wall of the existing hole, and at least three discrete second contact surfaces for abutting an exterior surface of the work piece surrounding the existing hole;

the at least three discrete second contact surfaces being substantially co-planar and being substantially perpendicular to the at least three discrete first contact surfaces;

each of the at least three discrete first contact surfaces being independently adjustable from a first radial distance to a second radial distance relative to the central aperture of the base;

a shaft having a first end sized to be received in an arbor of the hole saw and a second end to be slidably and rotatably received through the central aperture of the base; and the base biased to be located at or near the second end of the shaft.

14. The guide of claim 13, wherein each of the first contact surfaces is coupled to a track radially aligned between the central aperture and perimeter of the base.

15. The guide of claim 13, wherein each of the first contact surfaces is coupled to a slot cutout of the base radially aligned between the central aperture and perimeter of the base.

16. The guide of claim 13, wherein each of the first contact surfaces is reversibly coupled to one of a series of openings, the series of openings radially aligned between the central aperture and perimeter of the base, each of the openings corresponding to a pre-determined size of the existing hole in the work piece.

17. The guide of claim 13, wherein the base is a planar plate with the second contact surfaces located at a periphery of the plate and the first contact surfaces located proximal to the periphery of the plate.

18. The guide of claim 13, wherein the base is co-planar with the second contact surfaces and perpendicular to the first contact surfaces.

19. The guide of claim 13, wherein the base is non-planar and a central portion of the base is axially offset from a perimeter of the base.

20. The guide of claim 13, wherein the number of first contact surfaces range from 3 to 12.

21. The guide of claim 13, wherein the angular distance of a gap between consecutive first contact surfaces ranges from 20 degrees to 150 degrees.

22. The guide of claim 13, wherein the number of second contact surfaces range from 3 to 12.

23. The guide of claim 13, wherein the angular distance of a gap between consecutive second contact surfaces ranges from 20 degrees to 150 degrees.

24. The guide of claim 13, wherein the first contact surface is planar.

25. The guide of claim 13, wherein the first contact surface is a rectangular blade.

26. The guide of claim 13, wherein the first contact surface is arcuate and the radius of curvature of the first contact surface matches the radius of curvature of the interior cylindrical wall of the existing hole.

27. The guide of claim 13, wherein the base comprises at least three radial arms extending from a central portion of the base, one of the first contact surfaces and one of the second contact surfaces located on each radial arm.

* * * * *